United States Patent [19]

Moroto et al.

[11] Patent Number: 5,460,577
[45] Date of Patent: Oct. 24, 1995

[54] AUTOMATIC TRANSMISSION

[75] Inventors: Shuzo Moroto, Nagoya; Takeshi Inuzuka; Masashi Hattori, both of Anjo; Yutaka Taga, Aichi; Yasuo Hojo, Nagoya; Atsushi Tabata, Okazaki; Takayuki Okada, Toyota, all of Japan

[73] Assignees: Aisin Aw Co., Ltd.; Toyoda Jidosha Kabushiki Kaisha, both of Japan

[21] Appl. No.: 51,737

[22] Filed: Apr. 23, 1993

[30] Foreign Application Priority Data

Apr. 24, 1992 [JP] Japan .................................. 4-106638

[51] Int. Cl.⁶ ........................................................ F16H 3/62
[52] U.S. Cl. ........................................ 475/123; 475/119
[58] Field of Search .................................. 475/123, 121, 475/119

[56] References Cited

U.S. PATENT DOCUMENTS 4,987,792  1/1991  Mueller et al. ........................... 74/473

FOREIGN PATENT DOCUMENTS

| | | |
|---|---|---|
| 61-157855 | 7/1986 | Japan . |
| 2102965 | 4/1990 | Japan . |
| 3153958 | 1/1991 | Japan . |
| 3153957 | 1/1991 | Japan . |
| 3153956 | 1/1991 | Japan . |
| 3153955 | 1/1991 | Japan . |
| 3107663 | 8/1991 | Japan . |
| 3107662 | 8/1991 | Japan . |
| 3107661 | 8/1991 | Japan . |
| 3107660 | 8/1991 | Japan . |

*Primary Examiner*—Dirk Wright
*Attorney, Agent, or Firm*—Lorusso & Loud

[57] ABSTRACT

In an automatic transmission according to the present invention, a coast brake cutoff valve is arranged between a range-pressure-producing manual valve and shift valves and, when changed over, selectively feeds oil to hydraulic engine brake servomotors. An engine brake solenoid valve is on/off controlled by a shifting output signal from a CPU, whereby the coast brake cutoff valve is selectively changed over. A lockout valve is arranged between the coast brake cutoff valve and the manual valve and is connected to one of shifting solenoid valves. The automatic transmission can therefore be operated without trouble even when an electrical problem occurs in the shifting solenoid valves and/or the engine brake solenoid valve.

14 Claims, 12 Drawing Sheets

Fig.2

| Position | | | Solenoid | | | Clutch | | | Brake | | | |
|---|---|---|---|---|---|---|---|---|---|---|---|---|
| | | | S1 | S2 | S3 | C1 | C2 | C0 | B1 | B2 | B3 | B0 |
| D | AUTO. | 1ST | ○ | × | × | ○ | × | ○ | × | × | × | × |
| | | 2ND | ○ | ○ | × | ○ | × | ○ | × | ○ | × | × |
| | | 3RD | × | ○ | × | ○ | ○ | ○ | × | ○ | × | × |
| | | 4TH | × | × | × | ○ | ○ | × | × | ○ | × | ○ |
| | MANU. | 1ST | ○ | × | ○ | ○ | × | ○ | × | × | ○ | × |
| | | 2ND | ○ | ○ | ○ | ○ | × | ○ | ○ | ○ | × | × |
| S | | 1ST | ○ | × | × | ○ | × | ○ | × | × | × | × |
| | | 2ND | ○ | ○ | ○ | ○ | × | ○ | ○ | ○ | × | × |
| | | 3RD | × | ○ | × | ○ | ○ | ○ | × | ○ | × | × |
| | | (3RD) | × | × | × | ○ | ○ | ○ | × | ○ | × | × |
| L | | 1ST | ○ | × | ○ | ○ | × | ○ | × | × | ○ | × |
| | | 2ND | ○ | ○ | ○ | ○ | × | ○ | ○ | ○ | × | × |
| | | (1ST) | × | × | × | ○ | × | ○ | × | × | ○ | × |
| Remarks | | | ○ : ON | | | | | | Engaged | | | |
| | | | × : OFF | | | | | | Released | | | |

AUTOMATIC TRANSMISSION

BACKGROUND OF THE INVENTION

Field of the Invention

This invention relates to an automatic transmission, and more specifically to an automatic transmission which operates properly even when an electrical fault or problem occurs in any of its solenoid valves.

Description of the Related Art

In all conventional automatic transmissions, rotation produced by an engine is transmitted to a shift mechanism via a hydraulic power transmission so that different speeds are achieved by the shift mechanism. The shift mechanism is provided with a plurality of planetary gear units. Elements such as ring gears, carriers and sun gears, which make up each planetary gear unit, are selectively engaged or released by frictional engagement elements to achieve the different speeds.

A hydraulic circuit is provided to engage or release the respective frictional engagement elements. Oil at a regulated pressure is fed to or drained from a hydraulic servomotor corresponding to each frictional engagement element, whereby the frictional engagement element is either engaged or released at a predetermined timing.

Further, conventional automatic transmissions are each provided with "P" (parking), "R" (reverse), "N" (neutral), "D" (drive), "S" (second) and "L" (low) ranges so that, once a desired one of the "D" "S" and "L" ranges is selected by a driver, shifting can then be performed automatically.

In a 4-forward/1-reverse speed transmission, for example, shifting is automatically performed among the 1st speed to the 4th speed when the "D" range is selected by the driver, among the 1st speed to the 3rd speed when the "S" range is selected by the driver, and between the 1st speed and the 2nd speed when the "L" range is selected, all depending, for example, on vehicle speed, throttle position and various other running conditions.

Selection of each range in accordance with the driver's desire is conducted by moving a shift lever to one of the range positions arranged in a straight line, i.e. the so-called "I" pattern.

The above-described automatic transmission, however, does not permit free manual selection of any speed, so that the feel of the shifting is not satisfactory. However, a transmission has been disclosed in Japanese Patent Application Laid-Open (Kokai) No. HEI 2-8545, in which a shift lever is moved in a gear shift path to bring it into contact with one of plural sensors corresponding to different speeds and the desired speed is achieved in accordance with an electrical signal from the one sensor. Another transmission has been disclosed in Japanese Patent Application Laid-Open (Kokai) No. SHO 61-157855 which is provided with a shift pattern which includes shift positions arranged in a so-called "H pattern," in addition to the range positions employed in conventional automatic transmissions and arranged in the "I" pattern, whereby a driver is allowed to select either running in an automatic shifting mode or running in a manual shifting mode.

In automatic transmissions of the above-described type, it is possible to run in a manual shifting mode, for example, at the 1st to 4th forward and one reverse speeds, respectively, by moving a shift lever to one of the corresponding shift positions in the "H" pattern.

In the conventional automatic transmissions described above, the position of a range pressure producing means, namely, a manual valve, determines whether an engine brake is effectively applied or not. At the "D" range position, for example, it is impossible to effectively apply an engine brake responsive to running conditions.

The foregoing led to provision of a coast brake cutoff valve, for the selective application of an engine brake, between the manual valve and shift valves with the coast brake cutoff valve controlled by a solenoid valve. Such an arrangement made it possible to effectively apply an engine brake at the 1st and 2nd speeds regardless of the position of the manual valve, in other words, regardless of which is produced range pressure.

In an automatic transmission, various valves are controlled by selectively turning on/off their corresponding solenoid valves. Therefore it becomes impossible to perform a gear shift if an electrical problem occurs in the corresponding solenoid valve or valves. The automatic transmission is accordingly designed to be able to achieve three forward and one reverse speeds by controlling the manual valve even if one or more of the solenoid valves develop an electrical problem.

In the automatic transmission with the coast brake cutoff valve arranged between the manual valve and the shift valves, however, the coast brake cutoff valve can be changed over by on/off controlling an associated solenoid valve. If an electrical problem occurs in the associated solenoid valve, the manual valve and the shift valves are cut off from each other so that it becomes no longer possible to achieve the three forward and one reverse speeds, even when the manual valve is in one of positions "D", "S" and "L".

Further, development of any electrical problem with the solenoid valve controlling the coast brake cutoff valve makes it impossible to effectively apply an engine brake at the 1st and 2nd speeds.

An object of this invention is to overcome the above-described problems of the conventional automatic transmissions, and therefore to provide an automatic transmission in which corresponding engine brake or brakes can be selectively and effectively applied no matter which range pressure is produced by a range pressure producing means and, even if an electrical problem occurs in one or more solenoid valves, a necessary speed can still be achieved and necessary engine brake or brakes can still be effectively applied.

An automatic transmission according to the present invention is therefore provided with means for producing a range pressure in accordance with each position of the shift lever and also with a controller for outputting a shifting output signal in accordance with the position of the shift lever.

The automatic transmission is also provided with shifting solenoid valves which are switched between ON and OFF responsive to the shifting output signal from the controller, whereby shift valves are selectively changed over. A coast brake cutoff valve is arranged between the shift valves and the range pressure producing means and is capable of selectively feeding a hydraulic pressure to hydraulic engine brake servomotors.

The automatic transmission is further provided with an engine brake solenoid valve which is switched between ON and OFF responsive to the shifting output signal from the controller, whereby the coast brake cutoff valve is selectively switched. A lockout valve is arranged between the coast brake cutoff valve and the range pressure producing means and is capable of selectively feeding the range pressure to the coast brake cutoff valve.

The lockout valve is connected to one of the shifting solenoid valves and, upon occurrence of a problem in the shifting solenoid valves or the engine brake solenoid valve, feeds the range pressure as a signal hydraulic pressure to the coast brake cutoff valve so that a hydraulic pressure is selectively fed to the hydraulic engine brake servomotors via the coast brake cutoff valve.

As described above, the automatic transmission according to the present invention is provided with means for producing a range pressure in accordance with the position of the shift lever and is also provided with a controller for outputting a shifting output signal in accordance with the position of the shift lever.

The shifting solenoid valves, which are switched ON and OFF responsive to the shifting output signal from the controller, control the shift valves. It is therefore possible to achieve a desired speed in accordance with the position of the shift lever.

Arranged between the shift valves and the range pressure producing means is the coast brake cutoff valve which selectively feeds a hydraulic pressure to the hydraulic engine brake servomotors. The coast brake cutoff valve is changed over by switching ON and OFF the engine brake solenoid valve in accordance with a shifting output signal from the controller. When the engine brake solenoid valve is turned on, it is possible to effectively apply a desired engine brake by feeding a hydraulic pressure to the corresponding hydraulic engine brake servomotor via the coast brake cutoff valve and the corresponding shift valve.

The lockout valve is arranged between the coast brake cutoff valve and the range pressure producing means. The lockout valve is connected to one of the shifting solenoid valves so that, even if an electrical problem occurs in any one of the solenoid valves, the automatic transmission is still allowed to operate properly. This is hereinafter referred to as the "fail safe feature". The range pressure is fed, as a signal hydraulic pressure to the coast brake cutoff valve, whereby a hydraulic pressure is fed to the desired hydraulic engine brake servomotor via the coast brake cutoff valve.

Therefore an engine brake can still be applied effectively even if the vehicle is running in the fail safe mode.

BRIEF DESCRIPTION OF THE DRAWINGS

The above and other objects, features and advantages of the present invention will become apparent from the following description and the appended claims, taken in conjunction with the accompanying drawings, in which:

FIG. 2 is a gear engagement table illustrating operation of the automatic transmission;

DETAILED DESCRIPTION OF THE INVENTION AND PREFERRED EMBODIMENT

The automatic transmission according to a first embodiment of the present invention will hereinafter be described with reference to the accompanying drawings.

Figure 1:
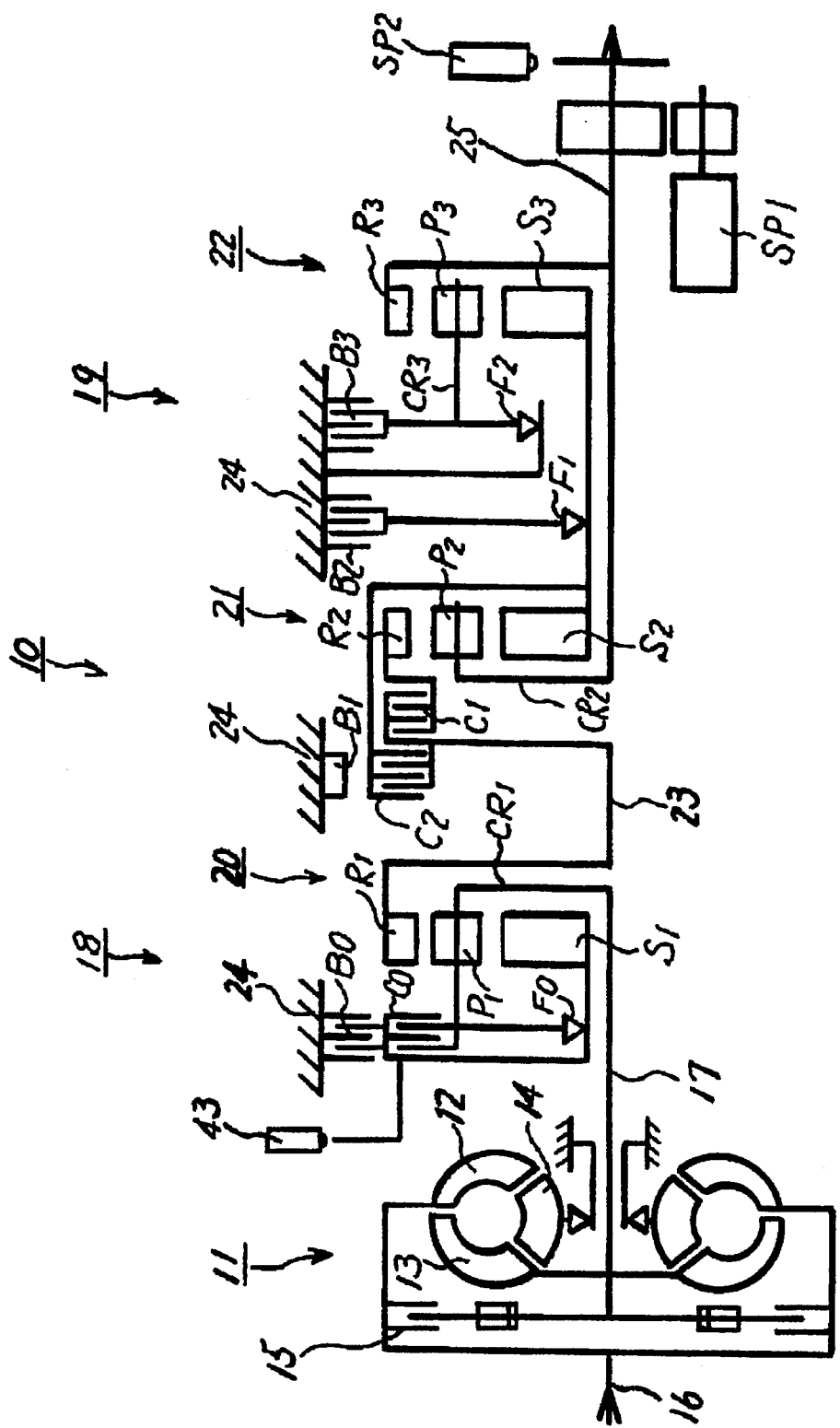
FIG. 1 is a schematic skeletal diagram of an automatic transmission according to one embodiment of the present invention.

In FIG. 1, the automatic transmission is constructed of a transmission (T/M) 10 and a torque converter 11. Rotation produced by an engine is transmitted to the transmission 10 via the torque converter 11 and, after being changed in speed by the transmission 10, is transmitted to drive wheels.

The torque converter 11 has a pump impeller 12, a turbine runner 13 and a stator 14. A lockup clutch 15 is also provided to improve the mechanical efficiency of power transmission. Rotation of an input member 16 is transmitted to an input shaft 17 of the transmission 10, either indirectly by flow of oil within the torque converter 11 or directly by locking the lockup clutch 15.

The transmission 11, on the other hand, is constructed of a secondary shifting unit 18 and a main shifting unit 19. The secondary shifting unit 18 is provided with an overdrive planetary gear unit 20, while the primary shifting unit 19 is provided with a front planetary gear unit 21 and a rear planetary gear unit 22.

The overdrive planetary gear unit 20 is connected to the input shaft 17, and includes a carrier $CR_1$ supporting a planetary pinion $P_1$ thereon, a sun gear $S_1$ surrounding the input shaft 11 and a ring gear $R_1$ connected to input shaft 23 of the main shifting unit 19. A third clutch C0 and a third one-way clutch F0 are interposed between the carrier $CR_1$ and the sun gear $S_1$, and a fourth brake B0 is disposed between the sun gear $S_1$ and a casing 24.

The front planetary gear unit 21 is connected to an output shaft 25, and includes a carrier $CR_2$ supporting a planetary pinion $P_2$ thereon, a sun gear $S_2$ surrounding the output shaft 25 and formed integrally with a sun gear $S_3$ of the rear planetary gear unit 22, and a ring gear $R_2$ connected to the input shaft 23 via a first clutch $C_1$. A second clutch $C_2$ is interposed between the input shaft 23 and the sun gear $S_2$, while a first brake B1 in the form of a band brake is interposed between the sun gear $S_2$ and the casing 24. Between the sun gear $S_2$ and the casing 24, a first one-way clutch F1 is disposed by way of a second brake B2.

The rear planetary gear unit 22, in turn, includes a carrier $CR_3$ supporting a planetary pinion $P_3$ thereon, a sun gear $S_3$, and a ring gear $R_3$ directly connected to the output shaft 25. Between the carrier $CR_3$ and the casing 24, a third brake B3 and a second one-way clutch F2 are arranged in parallel with each other. Designated at numeral 43 is an input rpm sensor, whereas symbols SP1 and SP2 indicate vehicle speed sensors.

At individual speeds in each of "D", "S" and "L" ranges, solenoid valves S1,S2,S3, the clutches C0,C1,C2 and the brakes B0,B1,B2,B3 of the automatic transmission are controlled as indicated by the gear engagement table shown in

FIG. 2.

In the 1st speed in the "D" or "S" range, the first solenoid valve S1 is turned on and, as a result, the third clutch C0 and the first clutch C1 are engaged, the third one-way clutch F0 and the second one-way clutch F2 are locked, and the remaining clutches and all the brakes are released. Therefore, the overdrive planetary gear unit 20 is directly connected with the input shaft 17 via the third clutch C0 and the third one-way clutch F0 and rotates integrally with the input shaft 17, whereby the rotation of the input shaft 17 is transmitted, as is, to the input shaft 23 of the main shifting unit 19. In the main shifting unit 19, on the other hand, the rotation of the input shaft 23 is transmitted via the first clutch C1 to the ring gear $R_2$ of the front planetary gear unit 21 and further to the carrier $CR_2$ and also to the output shaft 25 integral with the carrier $CR_2$, and a counterclockwise rotational force is applied via the sun gears S2,S3 to the carrier $CR_3$ of the rear planetary gear unit 22. The carrier $CR_3$ is however prevented from rotation due to the locking of the second one-way clutch F2, so that the planetary pinion $P_3$ undergoes self-rotation to transmit power to the ring gear $R_3$ which is integral with the output shaft 25.

At the 2nd speed in the "D" range, on the other hand, the second solenoid valve S2 is also turned on in addition to the first solenoid valve S1. As a result, the third clutch C0, the first clutch C1 and the second brake B2 are engaged and the third one-way clutch F0 and the first one-way clutch F1 are locked, but the remaining clutches and brakes are released. Accordingly, the overdrive planetary gear unit 20 remains directly connected so that the rotation of the input shaft 17 is transmitted, as is, to the input shaft 23 of the main shifting unit 19. In the main shifting unit 19, the rotation of the input shaft 23 is transmitted via the first clutch C1 to the ring gear $R_2$ of the front planetary gear unit 21, and a counterclockwise rotational force is applied to the sun gear $S_2$ via the planetary pinion $P_2$. The sun gear $S_2$ is however prevented from rotation because the first one-way clutch F1 is locked due to the engagement of the second brake B2. While allowing the planetary pinion $P_2$ to rotate by itself, the carrier $C_2$ is rotated and rotation of the second speed is thus transmitted to the output shaft 25 via the front planetary gear unit 21 alone.

At the 3rd speed in each of the "D" and "S" ranges, the first solenoid valve S1 and the third solenoid valve S3 are turned off, the third clutch C0, the first clutch C1, the second clutch C2 and the second brake B2 are engaged, the third one-way clutch F0 is locked, and the remaining brakes and clutches are released. Accordingly, the overdrive planetary gear unit 20 remains directly connected. In the main shifting unit 19, the front planetary gear unit 21 rotates with the input shaft 23 because of the engagement of the first clutch C1 and the second clutch C2. The rotation of the input shaft 23 is therefore transmitted, as is, to the output shaft 25.

At the 4th speed, that is, the maximum speed in the "D" range, the second solenoid valve S2 is also turned off, and the first clutch C1, the second clutch C2, the second brake B2 and the fourth brake B0 are engaged. Although the main shifting unit 19 remains directly connected as in the case of the third speed, the third clutch C0 and the fourth brake B0 in the overdrive planetary gear unit 20 are changed over so that the third clutch C0 is released but the fourth brake B0 is engaged. The sun gear $S_1$ is therefore locked by the engagement of the fourth brake B0. While the carrier $CR_1$ is rotating, the planetary pinion $P_1$ undergoes self-rotation so that power is transmitted to the ring gear $R_1$. As a consequence, the rotation of the overdrive planetary gear unit 20 is transmitted to the input shaft 23 of the main shifting unit 19, said input shaft 23 being directly connected to the ring gear $R_1$.

When downshifting, on the other hand, the third clutch C0 is engaged and the fourth brake B0 is released upon a 4→3 shift, the second clutch C2 is released upon a 3→2 shift, and the second brake B2 is released upon a 2→1 shift.

At the 1st and 3rd speeds in the "S" range, the solenoid valves, clutches and brakes are operated as in the corresponding speeds in the "D" range. At the 2nd speed, the first clutch C1, the third clutch C0 and the second brake B2 are engaged, the third solenoid valve S3 is turned on and the first brake B1 is engaged, whereby the sun gear $S_2$ of the main shifting unit 19 is locked to effectively apply an engine brake.

At the 2nd speed in the "L" range, the solenoid valves, clutches and brakes are operated as in the corresponding speed in the "S" range. At the 1st speed, the first clutch C1 and the third clutch C0 are engaged, the third solenoid valve S3 is turned on and the third brake B3 is engaged, whereby the carrier $CR_3$ of the rear planetary gear unit 22 is locked to effectively apply an engine brake.

In the manual shifting mode, operations of the solenoid valves, clutches and brakes at the 3rd and 4th speeds are the same as those at the corresponding speeds in the automatic shifting mode, their operations at the 2nd speed are the same as those at the 2nd speed in the "S" range, and their operations at the 1st speed are the same as those at the 1st speed in the automatic shifting mode.

Figure 3:
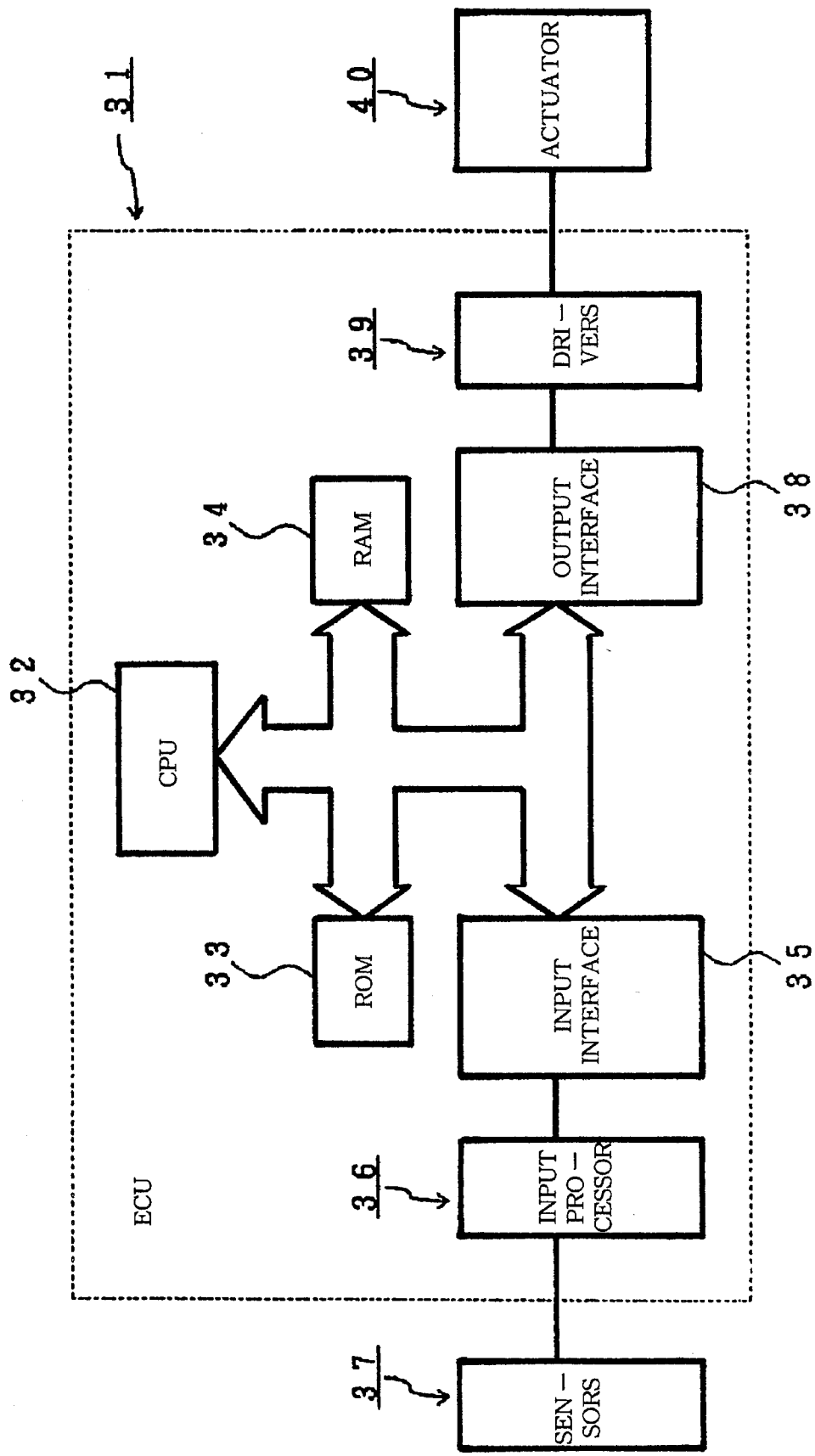
FIG. 3 is a simplified block diagram of a controller incorporated in the automatic transmission of the present invention.
Figure 4:
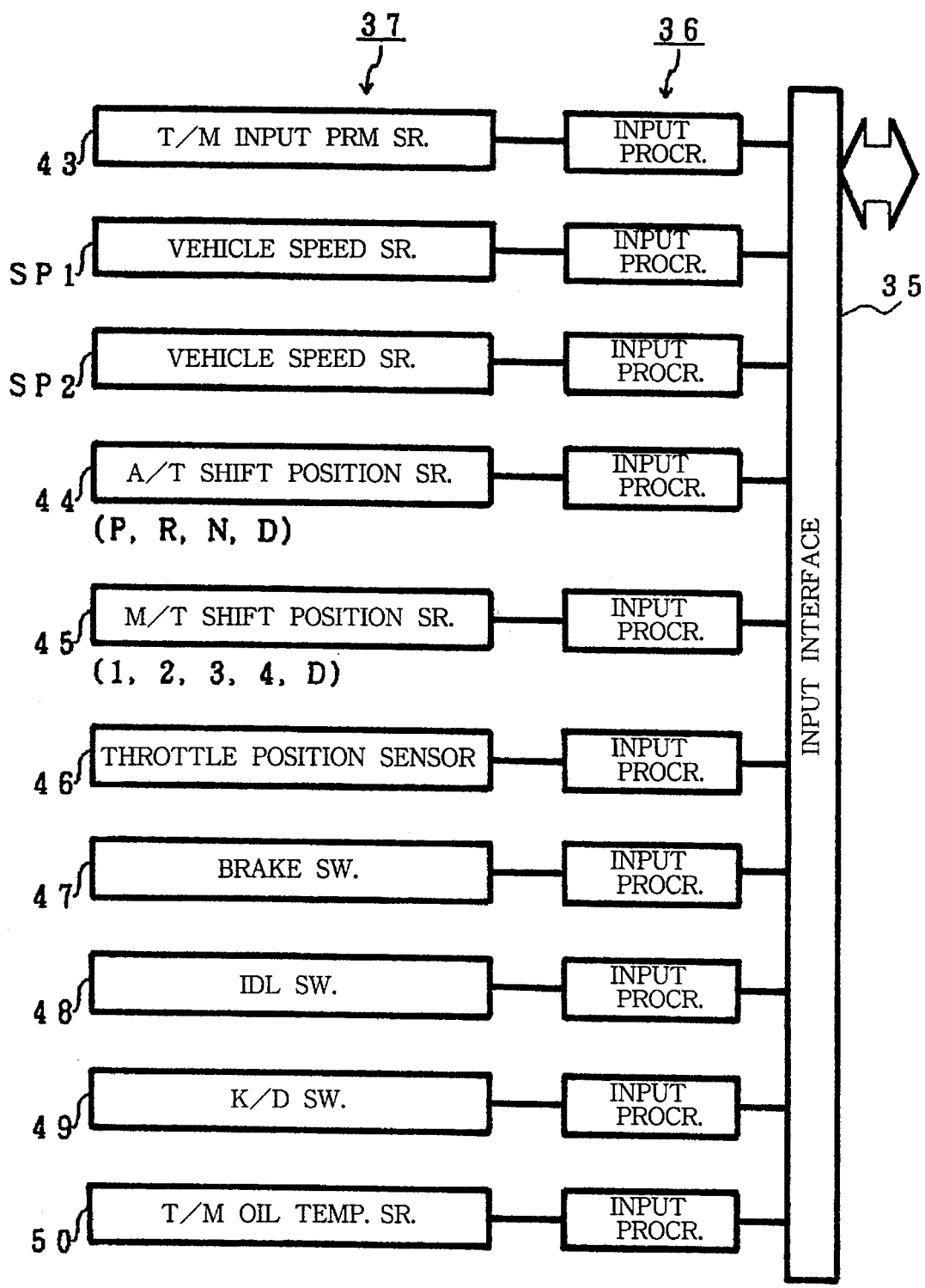
FIG. 4 is an input-side block diagram of the controller of FIG. 3.
Figure 5:
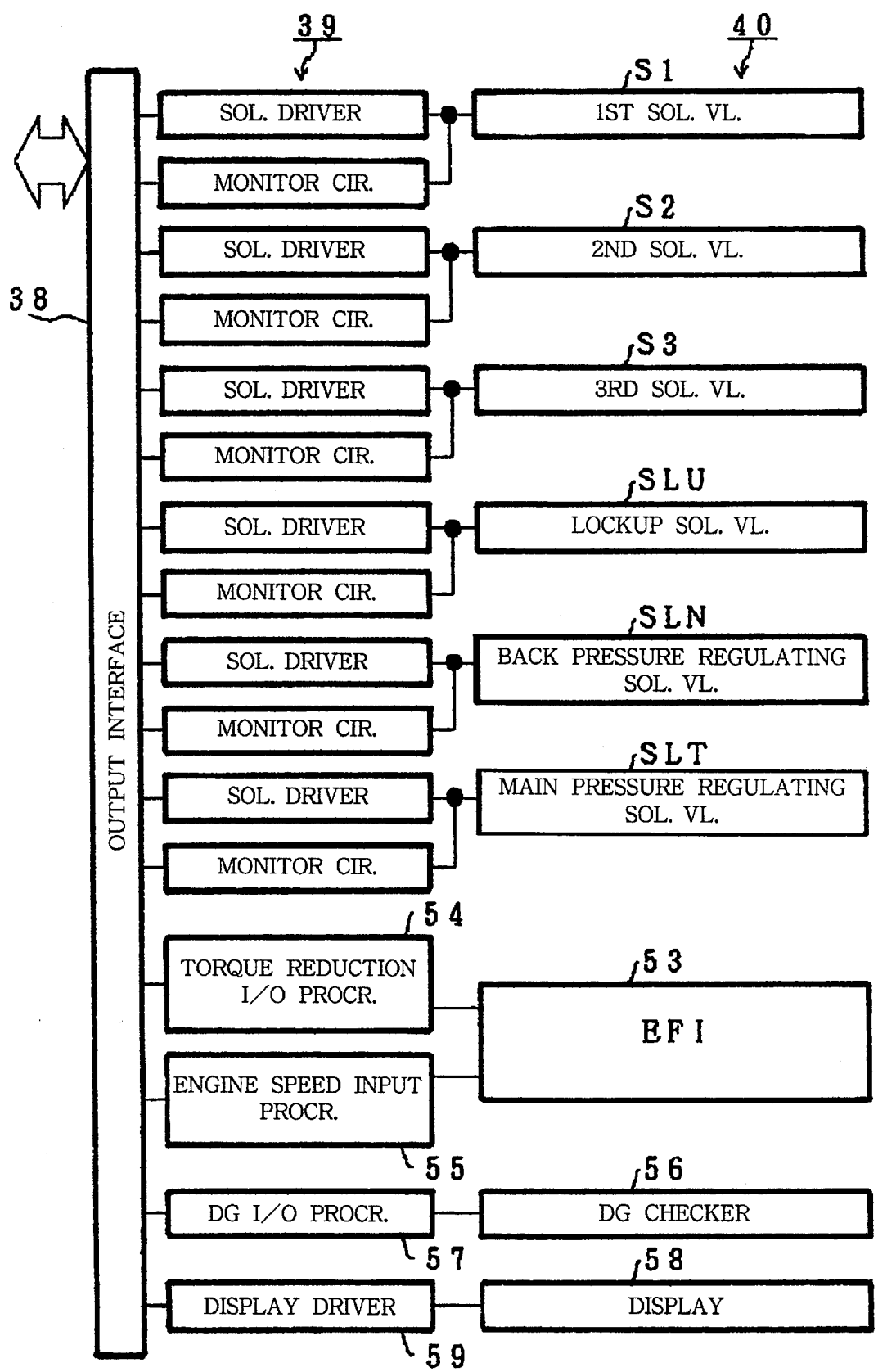
FIG. 5 is an output-side block diagram of the controller of FIG. 3.

The controller in the automatic transmission will next be described with reference to FIGS. 3, 4 and 5. These drawing FIGS show an automatic transmission controller (ECU) 31 for control of the entire automatic transmission, CPU 32, ROM 33, RAM 34, an input interface 35, an input processor 36, connected to the input interface 35 processing individual input signals, and sensors 37 for outputting signals to the input processor 36. Also illustrated are an output interface 38, drivers 39 connected to the output interface 38 for processing output signals, and an actuator 40 connected to the drivers 39 and driven by signals output from the drivers 39.

The input rpm sensor 43 detects the rotational speed of the third clutch C0 of the transmission 10. The vehicle speed sensors SP1,SP2 detect the rotational speed of the output shaft 25 of the automatic transmission. The vehicle speed sensor SP1 is used as a backup for the vehicle speed sensor SP2 in case the latter fails, and also as a speedometer.

Also shown are shift position sensors 44 disposed on the transmission 10 for detecting the range position in the "I" pattern the shift lever has selected in the automatic shifting mode (A/T), and a shift position sensor 45 associated with the shift lever for detecting the shift position in the "H" pattern selected by the shift lever in the manual shifting mode (M/T).

A throttle position sensor 46 is mounted on the engine to detect throttle position, corresponding to engine load, by application to a potentiometer. A brake switch 47 is associated with the brake pedal to detect operation of the brake pedal. An idle (IDL) switch 48 is connected to the throttle position sensor 46 to detect a full closure of the throttle valve. A kick-down (K/D) switch is associated with the accelerator pedal (or connected to the throttle position sensor 46) to detect when the throttle valve is fully opened and a kick-down is needed. An oil temperature sensor 50 is mounted within the transmission 10 to detect the temperature of the oil in the transmission 10.

The individual sensors 37 are connected to the corresponding input processors 36.

A first shifting solenoid valve S1, a second shifting solenoid valve S2, and a third shifting solenoid valve S3 are selectively switched ON or OFF in accordance with the speed, whereby the associated shift valves are controlled. Also depicted are a lockup (L-up) linear solenoid valve SLU, a linear solenoid valve SLN for controlling back pressure of the accumulator, and a linear solenoid valve SLT for controlling the main pressure. Between these solenoid valves S1–S3 and linear solenoid valves SLU, SLN, SLT and the output interface 38, are arranged the drivers 39 such as solenoid drivers and monitor circuits. The solenoid drivers generate a voltage or current to drive the corresponding solenoid valves S1–S3 and linear solenoid valves SLU, SLN, SLT, while the monitor circuits check operations of the corresponding solenoid valves S1–S3 and linear solenoid valves SLU, SLN, SLT and judge whether they are in order or not, that is, the monitor circuits serve to conduct a self-diagnosis.

There are also depicted an engine controller (EFI) for controlling the engine and a torque reduction i/o processor 54 for outputting a signal to temporarily reduce torque produced by the engine so that shift shock by a gear shift can be reduced. Upon reception of the signal from the torque reduction i/o processor 54, the engine controller 53 retards the ignition timing, cuts off the fuel supply, etc. Designated at numeral 55 is an engine speed input processor for inputting rotational speed of the engine.

A DG checker 56 outputs the results of self-diagnosis by means of an "O/D OFF" indicator lamp, upon occurrence of a fault in the transmission 10 or in the engine controller 53. A DG i/o processor 57 outputs the results of the self-diagnosis to the DG checker 56. A display 58, such as a mode selection lamp or "O/D OFF" indicator, indicates the condition of the transmission 10 and a display driver 59 actuates the display 58.

Operation of the controller in the automatic transmission constructed as described above will be described next with reference to FIG. 6 through FIG. 9.

Figure 9:
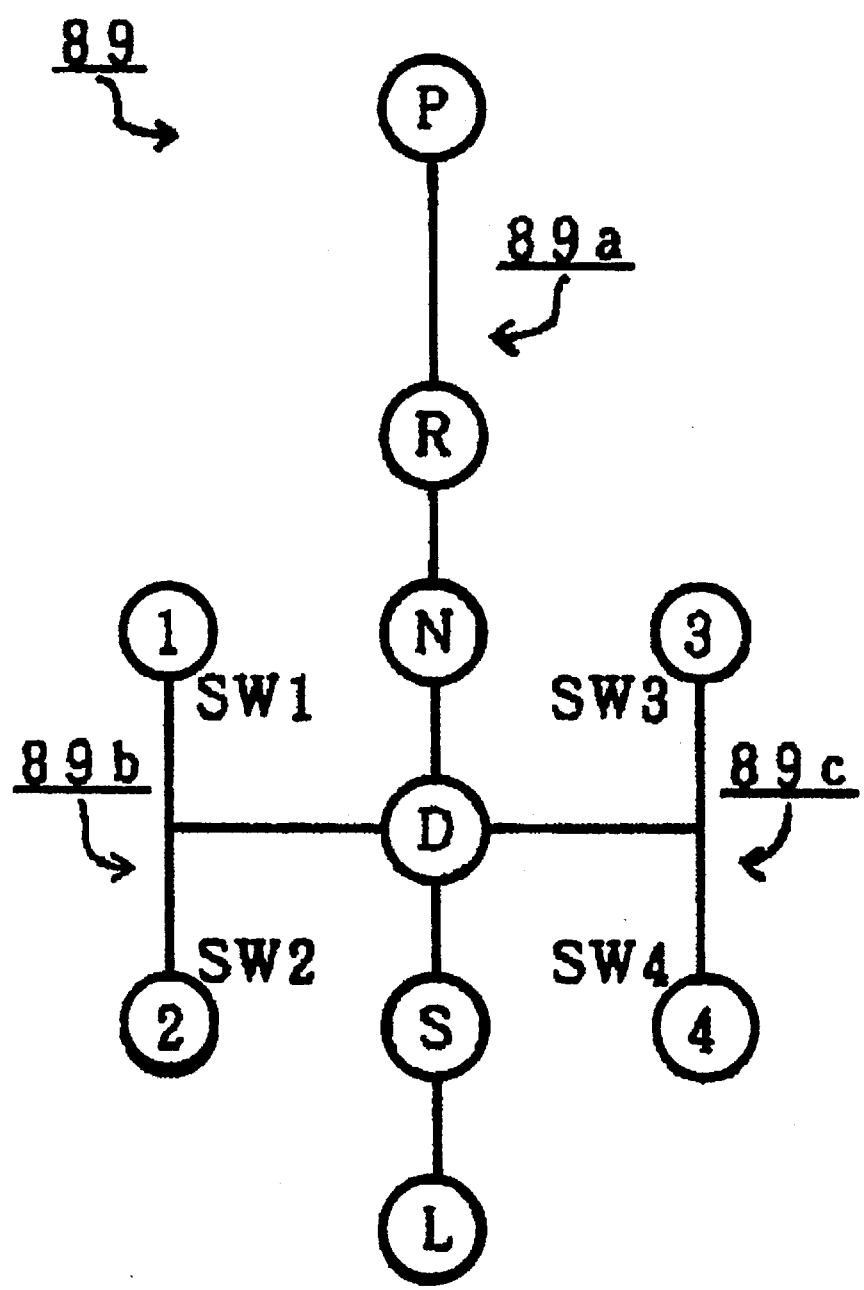
FIG. 9 is a shift pattern diagram for the automatic transmission of the present invention.

FIG. 9, illustrates a shift pattern 89, which includes an "I" pattern 89a, a low-speed-side shift train 89b forming a part of an "H" pattern and arranged on the left-hand side of the "I" pattern 89a, and a high-speed-side shift train 89c, completing the "H" pattern and disposed on the right-hand side of the "I" pattern 89a.

Designated at SW1 to SW4 are switches arranged at shift positions which correspond to the respective 1st to 4th speeds. The switches SW1 to SW4 are each turned on when the shift lever moves to the corresponding shift position but turned off when the shift lever moves away from that position.

Figure 6:
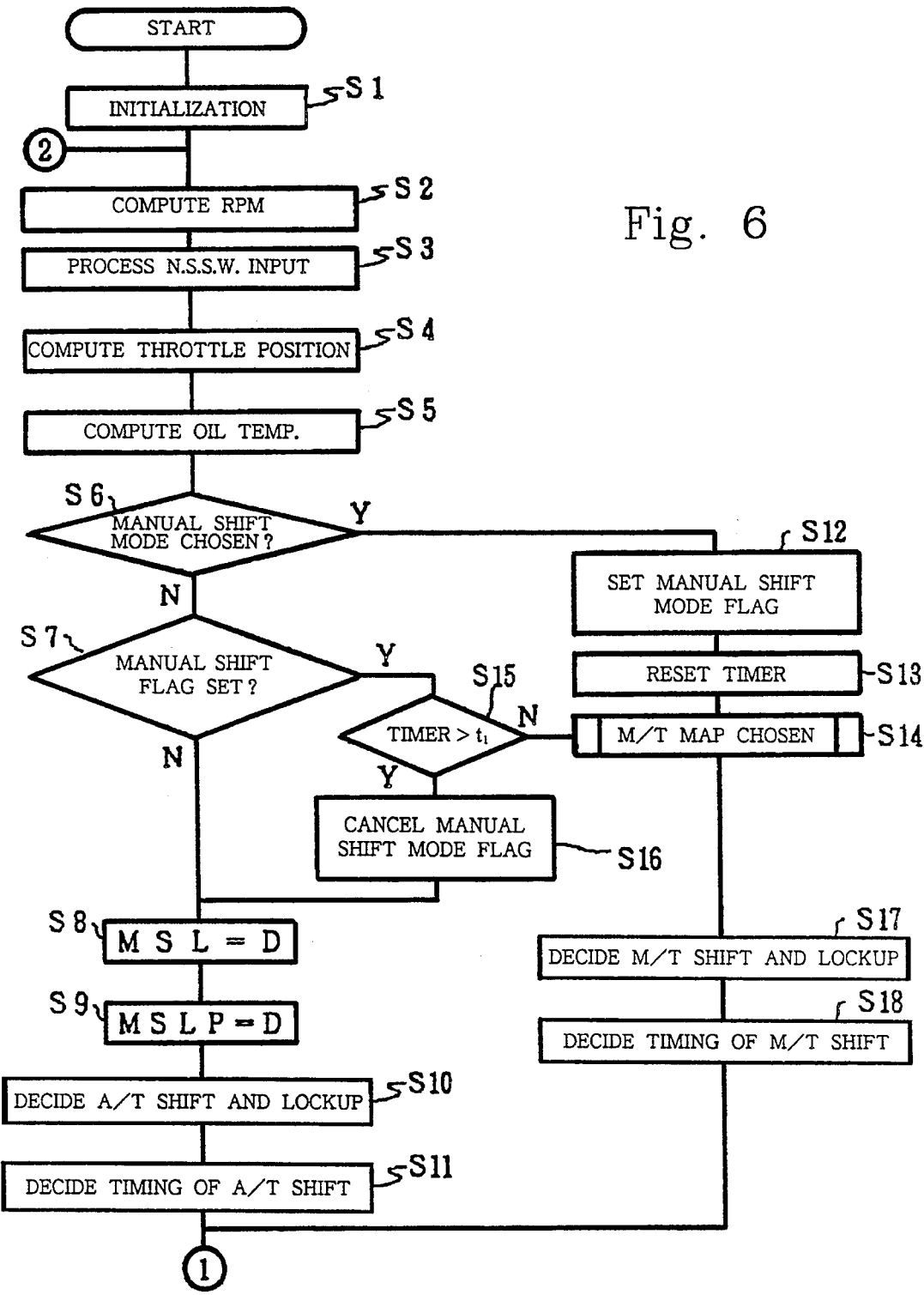
FIG. 6 is a first flow chart of operation of the controller of FIG. 3.
Figure 7:
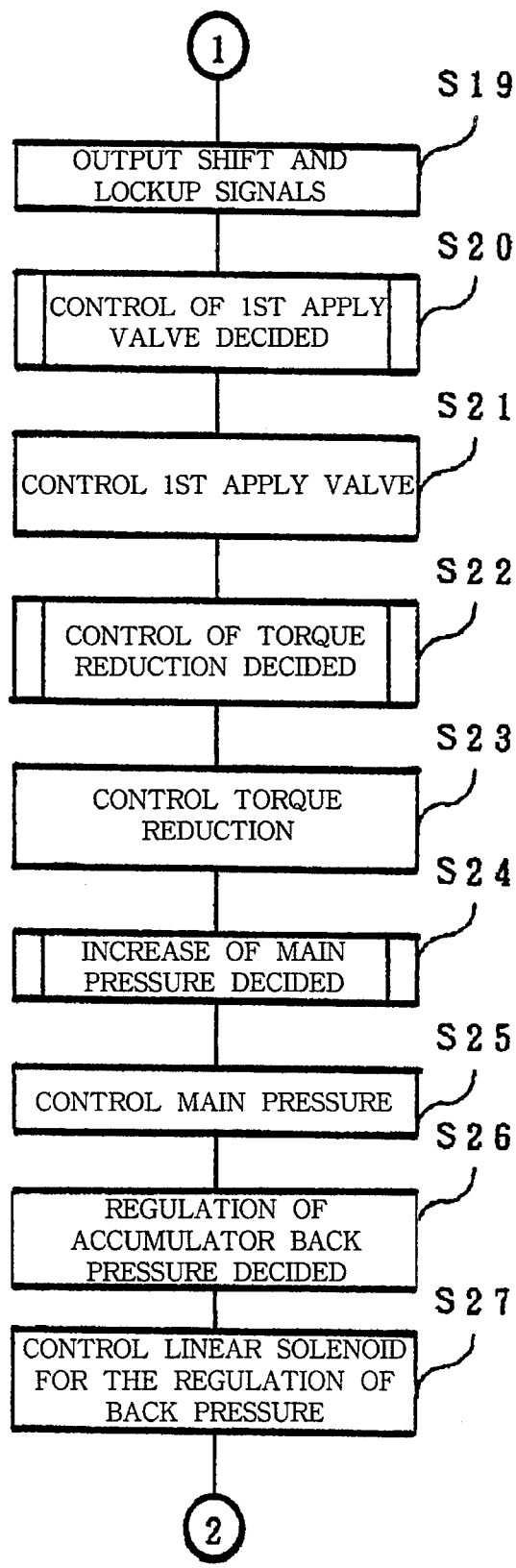
FIG. 7 is a second flow chart of operation of the controller of FIG. 3.

Referring now to FIGS. 6 and 7:

Step S1—Upon starting a program, initialization is conducted with respect to each condition.

Step S2—Based on a signal from the input rpm sensor 43 of the automatic transmission and another signal from the vehicle speed sensor SP1 or SP2, the current rotational speeds of the input shaft 17 and output shaft 25 of the automatic transmission are computed.

Step S3—Based on a signal from the shift position sensor 44 of the automatic transmission, the range position now selected in the "I" pattern is detected. At the same time, it is also judged whether the neutral start switch (N.S.S.W.) is in order or not.

Step S4—Based on a signal from the throttle position sensor 46, the current throttle position is computed.

Step S5—Based on a signal from the oil temperature sensor 50, the current oil temperature (ATF temperature) of the automatic transmission is computed.

Step S6—It is judged whether or not the shift position sensor 45 has been turned on. The routine advances to Step 12 when "on" but to Step S7 when "off".

Step S7—It is judged whether a manual shift mode flag has been set. The routine advances to Step 15 when "set" but to Step S8 when "not set".

Step S8—Automatic shifting data D are read as automatic shifting shift point data MSL in a shift diagram table.

Step S9—The automatic shifting data D are read as automatic shifting lockup point data MSLP.

Step S10—Based on the automatic shifting data D read in steps S8,S9 and the respective running conditions computed in advance, a gear shift and lockup are decided.

Step S11—Timing of the gear shift and for lockup determined in Step 10 are decided.

Step S12—If the shift position sensor 45 is found in step S6 to have been turned on, the manual shift flag is set to establish the manual shifting mode.

Step S13—The value of a timer for returning to the automatic shifting mode is reset.

Step S14—A map for the manual shifting mode is chosen and various data are read, and processing of the data is performed in accordance with the manual shifting map so chosen.

Step S15—If the manual shift mode flag is found in Step 7 to have been set, the value of the timer for returning to the automatic shifting mode is compared with a preset value $t_1$. The routine advances to Step S14 when the timer valve is smaller than the preset value $t_1$ but to Step S16 when greater than the preset valve $t_1$.

Step S16—The manual shift mode flag is cancelled, and the routine advances to Step S8 to return to the automatic shifting mode.

Step S17—Based on shifting data read in a manual shifting map choosing sub-routine and the various running conditions computed in advance, a gear shift and lockup are decided.

Step S18—Timing for the gear shift and for lockup determined in Step 17 are decided.

Step S19—In accordance with the decisions in Steps S10,S11,S17,S18, shifting output signals are outputted to the solenoid valves S1–S3 and linear solenoid valves SLU,SLN,SLT so that the gear shift is started.

Step S20—A first apply valve (orifice control valve) is controlled during a transition period of the gear shift in the manual shifting mode, and processing is performed to judge whether or not the lag time should be shortened.

Step S21—In accordance with the judgment in the subroutine of Step S20, the lockup-controlling linear solenoid valve SLU is controlled.

Step S22—A judgement is made whether or not torque reduction control is needed to reduce shift shock.

Step S23—In accordance with the judgment in the subroutine of Step S22, the torque reduction control is performed.

Step S24—During the transition period of the gear shift in the manual shifting mode, processing is performed to judge whether or not the main pressure should be temporarily raised to shorten the lag time.

Step S25—In accordance with the judgment in the subroutine of Step 24, the main-pressure-controlling linear solenoid valve SLT is controlled.

Step S26—Processing is performed to judge whether or not the back pressure of the accumulator should be controlled to avoid occurrence of shift shock during the transition period of the gear shift.

Step S27—In accordance With the judgment in the subroutine of Step S26, the linear solenoid valve SLN for controlling the back pressure of the accumulator is controlled.

Figure 8:
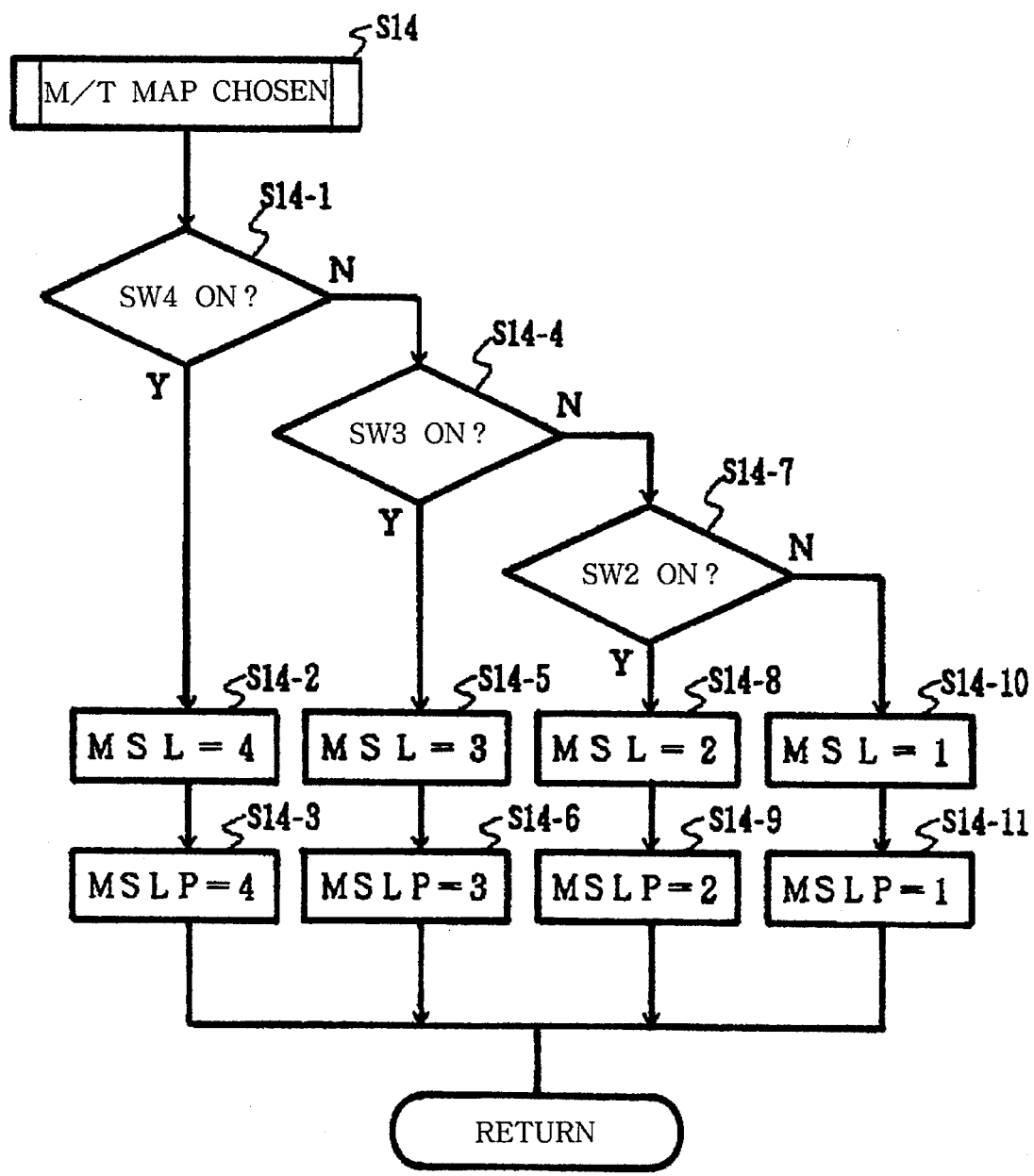
FIG. 8 is a third flow chart of operation of the controller of FIG. 3.

FIG. 8 illustrates the manual-shifting-map-choosing subroutine in Step 14 illustrated in FIG. 6.

Step S14-1—A judgment is made as to whether or not the switch SW4 at the 4th speed position in the shift position sensor 45 has been turned on.

Step S14-2—If the Switch SW4 at the 4th speed position has been found "on" in Step S14-1, 4th speed gear ratio data are read as manual shifting shift point data MSL.

Step S14-3—The 4th speed gear ratio data are read as manual shifting lockup point data MSLP.

Steps S14-4 to S14-6—Control is performed as in Steps S14-1 to S14-3 to read 3rd speed gear ratio data.

Steps S14-7 to S14-9—Control is performed as in Steps S14-1 to S14-3 to read 2nd speed gear ratio data.

Steps S14-10 to S14-11—As the manual shifting shift point data MSL and the manual shifting lockup point data MSLP, 1st speed gear ratio data are read.

Figure 10:
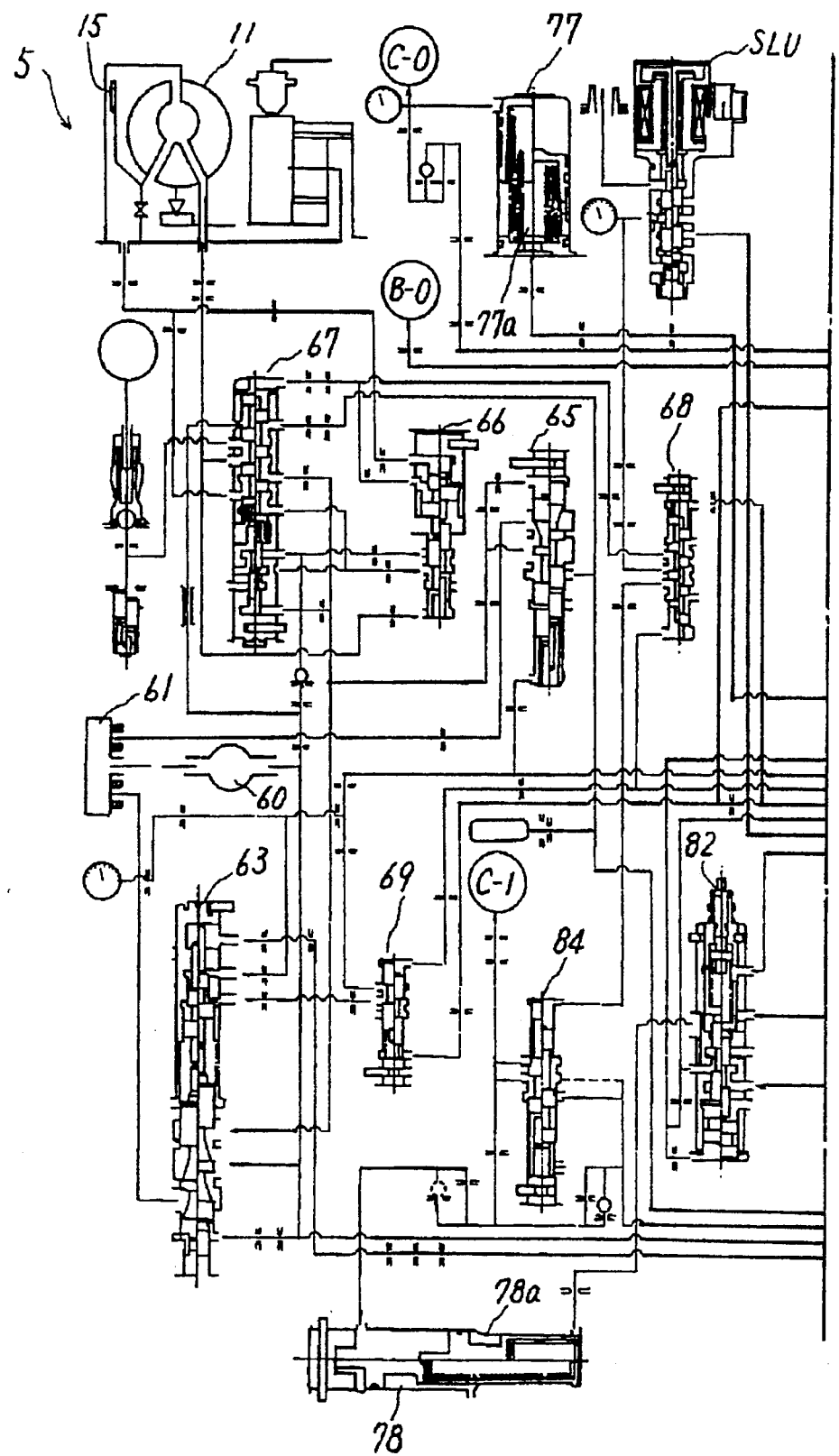
FIG. 10 is a first hydraulic circuit diagram of the automatic transmission of the present invention.
Figure 11:
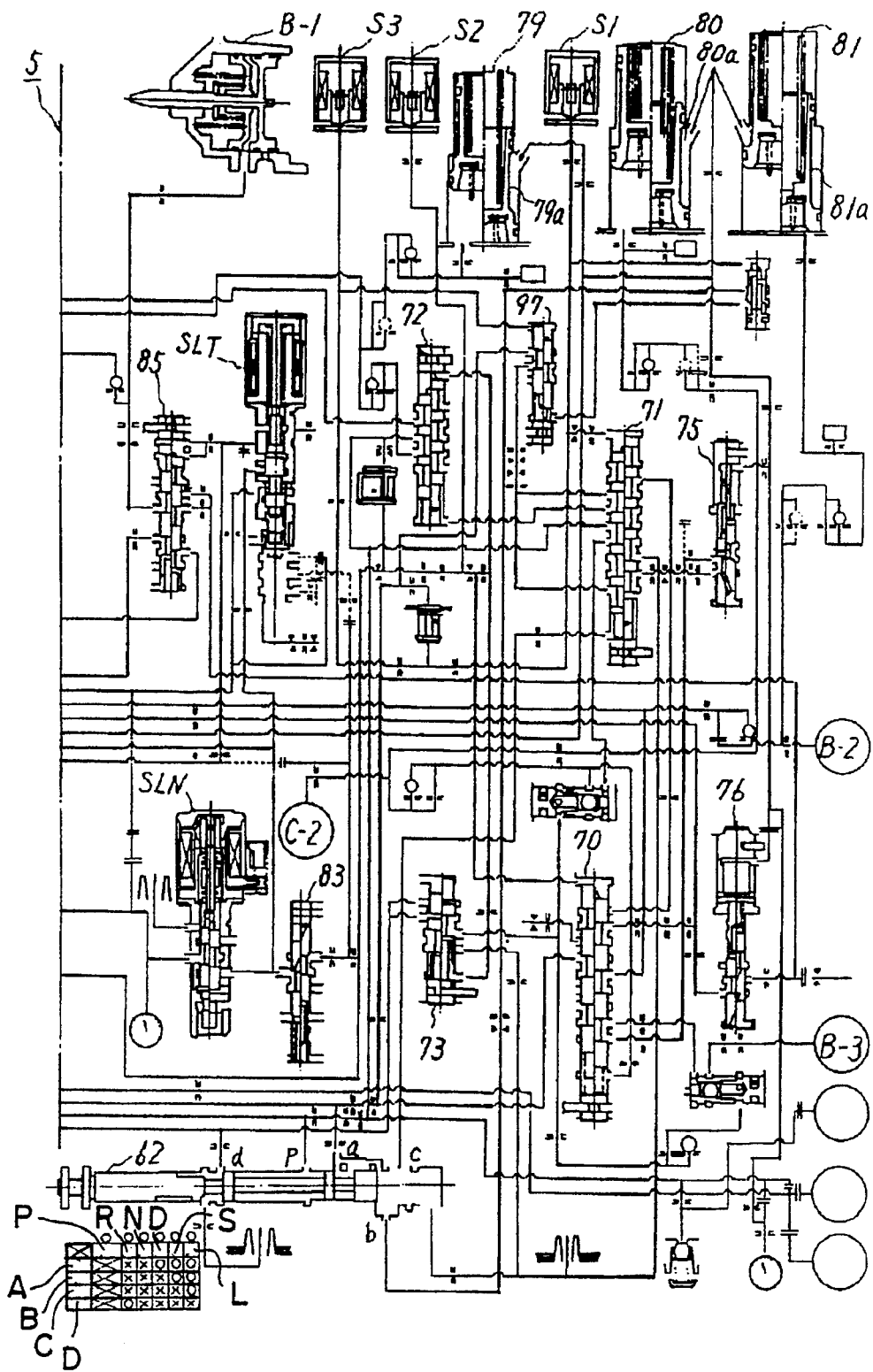
FIG. 11 is a second hydraulic circuit diagram of the automatic transmission of the present invention.

Reference is next had to FIGS. 10 and 11, which illustrate the first and second circuit diagrams, respectively, and show the overall hydraulic circuit of the automatic transmission according to the present invention.

In FIGS. 10 and 11, there are illustrated a hydraulic servomotor C-O for the third clutch CO, a hydraulic servomotor C-1 for the first clutch C1, a hydraulic servomotor C-2 for the second clutch C2, a hydraulic servomotor B-0 for the fourth brake BO, a hydraulic servomotor B-1 for the first brake B1, a hydraulic servomotor B-2 for the second brake B2, and a hydraulic servomotor B-3 for the third brake B3. Designated at numeral 11 is the torque converter. Numeral 61 indicates a hydraulic pump, while numeral 61 designates a strainer.

Designated at numeral 62 is a manual valve which is repositioned when the driver operates the shift lever to effect a gear shift. The manual valve 62 is connected via a push-pull cable to the shift lever disposed adjacent to the driver's seat so that the manual valve 62 is moved to one of the positions "P", "R", "N", "D", "S" and "L" by movement of the shift lever. As a consequence, a main pressure port p is selectively connected with individual ports a,b,c,d as indicated by the mark "O" in the table shown in FIG. 11.

A primary regulator valve 63 regulates the main pressure in accordance with throttle modulator pressure and a main pressure in the "R" range. The primary regulator valve 63 feeds an oil pressure, which has been regulated as described above, to a lockup relay valve 67 and a secondary regulator valve 65. The lockup relay valve and secondary regulator valve will be described subsequently.

A throttle valve 64 selectively compresses two springs, one being disposed in an upper part of the throttle valve and the other in a lower part of the throttle valve, in accordance with the degree of depression of the accelerator pedal and, by a cutback pressure from a cutback valve 49 to be described subsequently, obtains a throttle pressure corresponding to output of the engine.

Designated at numeral 65 is the secondary regulator valve which regulates the hydraulic pressure fed from the primary regulator valve 63 to provide a lubricating hydraulic pressure and feeds the lubricating hydraulic pressure to the lockup relay valve 67.

A lockup control valve 66 regulates hydraulic pressure to a control oil compartment formed at one end of the lockup relay valve 67. The lockup relay valve 67 is actuated by signal hydraulic pressures from the third solenoid valve S3 and the solenoid relay valve 68, respectively, and engages or releases the lockup clutch 15 of the torque converter 11.

A cutoff valve 69 causes a cutback pressure to act on the throttle valve 64 so as to regulate the throttle pressure. In each range other than the "L" range or "R" range, the cutback valve 69 is actuated by hydraulic pressures applied to the hydraulic servomotor B-1 and the hydraulic servomotor B-2, respectively.

Numeral 70 indicates a 1–2 shift valve which changes over from the 1st speed to the 2nd speed and vice versa. The hydraulic pressure of the second solenoid valve S2 is received in a control oil compartment formed at one end of the 1–2 shift valve. The 1–2 shift valve 70 takes the right-hand position in 1st speed but the left-hand position in 2nd, 3rd and 4th speeds. In this manner, the 1–2 shift valve 70 takes the right-hand position in 1st speed so that the feeding of the oil to the hydraulic servomotor B-1 and the hydraulic servomotor B-2 is stopped and the oil can be fed to the hydraulic servomotor B-3 only in the "L" range. When changed to the 2nd speed, the 1–2 shift valve 70 takes the left-hand position so that the hydraulic pressure from the manual valve 62 can be fed to the hydraulic servomotor B-2. In the "S" range and "L" range, on the other hand, the 1–2 shift valve 70 receives a hydraulic pressure from a 2–3 shift valve 71 to be described subsequently, and feeds the hydraulic pressure to the hydraulic servomotor B-1 via a second coast modulator valve 76.

A 2–3 shift valve 71 governs changes from the 2nd speed to the 3rd speed and vice versa. The hydraulic pressure of the first solenoid valve S1 is received in a control oil compartment formed at one end of the 2–3 shift valve 71. The 2–3 shift valve 71 takes the right-hand position at the 1st speed and the 2nd speed but the left-hand position at the 3rd speed and the 4th speed. Thus, the feeding of the oil to the hydraulic servomotor C-2, said feeding having been stopped at the 1st speed and the 2nd speed, is resumed when the speed is changed to the 3rd speed.

A 3–4 shift valve 72 governs changes from the 3rd speed to the 4th speed and vice versa. The hydraulic pressure of the second solenoid valve S2 is received in a control oil compartment formed at one end of the 3–4 shift valve. The 3–4 shift valve takes the right-hand position at the 1st speed, 2nd speed and 3rd speed but the left-hand position at the 4th speed. Thus, the feeding of the oil to the hydraulic servomotor C-O, said feeding having been effected at the 1st speed, 2nd speed and 3rd speed, is stopped when the speed is changed to the 4th speed and the 3–4 shift valve 72 therefore takes the left-hand position. On the other hand, the feeding of the oil to the hydraulic servomotor B-O, said feeding having been stopped at the 1st speed, 2nd speed and 3rd speed, is resumed.

Actuation of a reverse inhibition valve 73 stops the feeding of the oil to the hydraulic servomotor C-2 upon release of the second solenoid valve S2 when the vehicle speed is, for example, 9 km/hr or higher.

A low coast modulator valve 75 and a second coast modulator valve 76 are actuated to apply an engine brake.

The clutches C0, C1, C2 and the brakes B0, B2 are provided with respective accumulators. Specifically, these include an accumulator 77 for the third clutch C0, an accumulator 78 for the first clutch C1, an accumulator 79 for the fourth brake B0, an accumulator 80 for the second clutch C2, and an accumulator 81 for the second brake B2. An accumulator control valve 82 regulates the hydraulic pressures to be applied, respectively, to back pressure compartments 77a,78a, 79a,80a,81a of the accumulator 77 for the third clutch C0, the accumulator 78 for the first clutch C1, the accumulator 79 for the fourth brake B0, the accumulator 80 for the second clutch C2 and the accumulator 81 for the second brake B2. Accumulator control valve 82 also regulates the hydraulic pressures applied to the low coast modulator valve 75 and the second coast modulator valve 76. Designated at numeral 97 is a coast brake cutoff valve.

The first solenoid valve S1 and the second solenoid valve S2 are provided to change over and control the 1–2 shift valve 70, the 2–3 shift valve 71 and the 3–4 shift valve 72 as described above. The third solenoid valve S3 is provided to change over and control the coast brake cutoff valve 97. Designated by symbols SLU, SLN and SLT are the linear solenoid valves, to which hydraulic pressures regulated by the solenoid modulator valve 83 are fed.

Numeral 84 indicates an orifice control valve while numeral 85 designates a cutoff valve.

To make it possible to effectively apply an engine brake at the 1st speed and the 2nd speed, irrespective of the position of the manual valve 62,the coast brake cutoff valve 97, located between the manual valve 62 and the 2–3 shift valve 71, selectively applies an engine brake. The coast brake cutoff valve 97 is changed over by the third solenoid valve S3.

Figure 12:
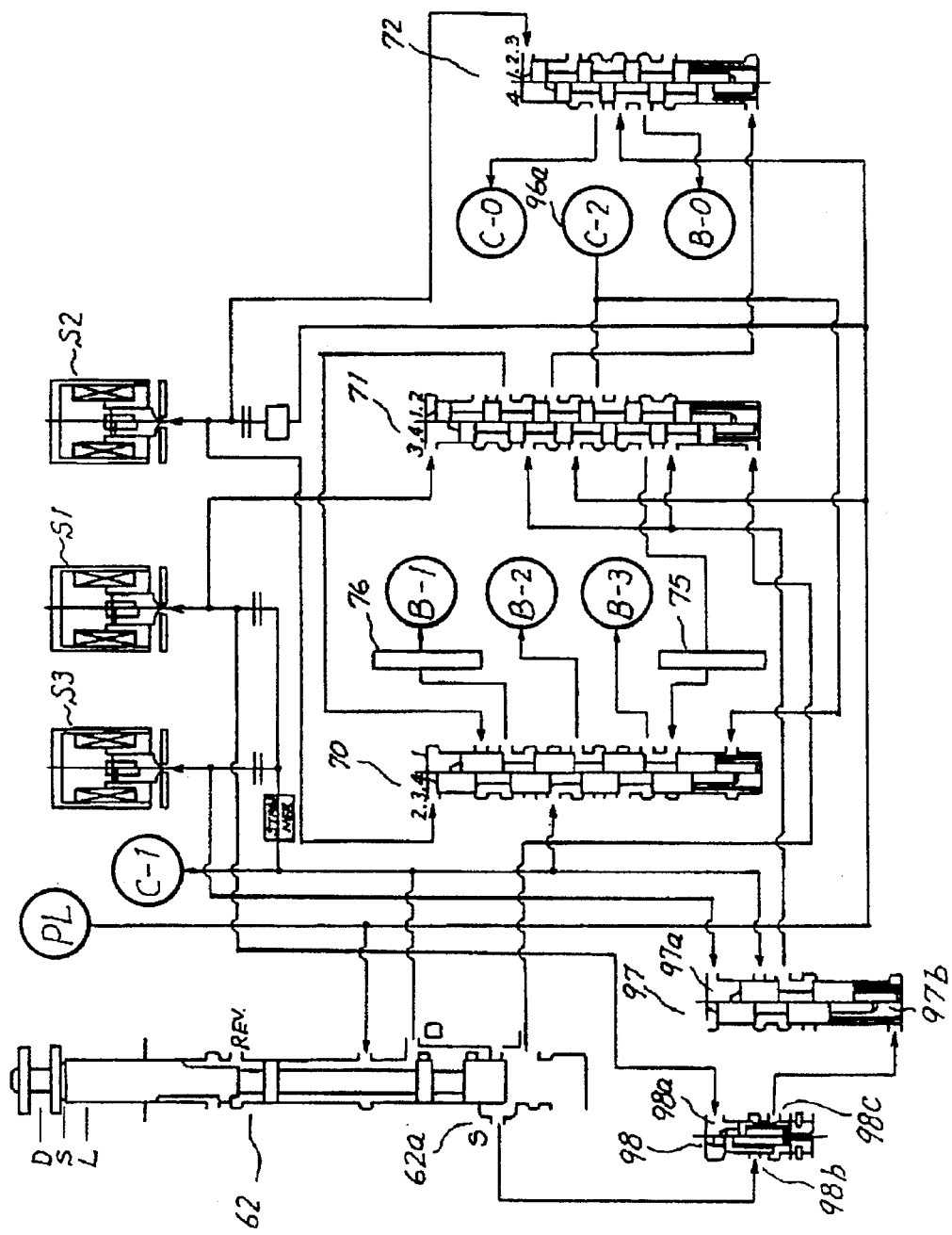
FIG. 12 is a fragmentary hydraulic circuit diagram of the automatic transmission of the present invention.

Referring to FIG. 12, in which symbol PL indicates a main pressure source, the main pressure is changed by controlling the linear solenoid valve SLT as described above. FIG. 12 also illustrates the first, second and third solenoid valves S1–S3, the manual valve 62, the 1–2 shift valve 70, the 2–3 shift valve 71, the 3–4 shift valve 72, the low coast modulator valve 75, and the second coast modulator valve 76.

Coast brake cutoff valve 97 has a first control oil compartment 97a and a second control oil compartment 97b. When the third solenoid valve S3 is turned on, the oil inside the first control oil compartment 97a is drained so that the coast brake cutoff valve 97 takes the left-hand position. When the third solenoid valve S3 is turned off, on the other hand, the oil is fed into the first control oil compartment 97a so that the coast brake cutoff valve 97 takes the right-hand position.

As shown in the gear engagement diagram of FIG. 2, the third solenoid valve S3 is turned off at the 1st to 4th speeds in the "D" range of the automatic shifting mode. To effectively apply an engine brake, the third solenoid valve S3 is turned off at the 1st and 3rd speeds in the "S" range, is turned on at the 2nd speed in the "S" range, and is turned on at the 1st and 2nd speeds in the "L" range. In the manual shifting mode, on the other hand, the third solenoid valve S3 is turned on at the 1st and 2nd speeds but is turned off at the 3rd and 4th speeds. However, when an engine brake is not necessary at the 1st and 2nd speeds, the third solenoid valve S3 can be turned off at the 1st and 2nd speeds.

To apply an engine brake at 1st speed in the manual shifting mode, the coast brake cutoff valve 97 takes the left-hand position so that the oil from the manual valve 62 is fed to the hydraulic servomotor B-3 via the 2–3 shift valve 71 and the 1–2 shift valve 70 and the third brake B3 is thereby engaged. To apply an engine brake at the 2nd speed in the manual shifting mode, on the other hand, the coast brake cut off valve 97 takes the left-hand position so that the oil from the manual valve 62 is fed to the hydraulic servomotor B-1 via the 2–3 shift valve 71 and the 1–2 shift valve 70 and the first brake B1 is thereby engaged.

At the 1st speed in the "S" range in the automatic shifting mode, on the other hand, the third solenoid valve S3 is turned off to inhibit any engine brake. The feeling of a gear shift is therefore improved.

At the 2nd speed in the "S" range and the 1st and 2nd speeds in the "L" range in the automatic shifting mode, the third solenoid valve S3 is turned on so that an engine brake can be effectively applied.

The automatic transmission according to the present invention is designed to change over the 1–2 shift valve 70, 2–3 shift valve 71 and 3–4 shift valve 72 by selectively on/off controlling the first solenoid valve S1 and second solenoid valve S2. Even if the first solenoid valve S1 and the second solenoid valve S2 develop an electrical problem and are both turned off, the fail safe feature makes it possible to still perform running at a desired speed stage without trouble. Namely, it is possible to achieve the 4th speed in the "D" range, the 3rd speed in the "S" range, and the 1st speed in the "L" range.

When the third solenoid valve S3 also develops an electrical problem and is turned off, while running in a fail safe mode, a signal hydraulic pressure is applied to the control oil compartment 97a of the coast brake cutoff valve 97.

An overdrive lockout valve 98 is therefore arranged between the coast brake cutoff valve 97 and the manual valve 62 so that the overdrive lockout valve 98 prevents the coast brake cutoff valve 97 from taking the right-hand position.

Accordingly, the control oil compartment 98a in the end of the overdrive lockout valve 98 is connected to the first solenoid valve S1 and takes the left-hand position when the first solenoid valve S1 is turned on but the right-hand position when the first solenoid valve S1 is turned off. Further, the overdrive lockout valve 99 is provided with ports 98b,98c, the port 98b being connected to a port 62a through which the manual valve 62 produces an "S" range pressure, and the port 98c being connected to the second control oil compartment 97b of the coast brake cutoff valve 97.

If the third solenoid valve S3 develops an electrical problem and is turned off, the first solenoid valve S1 is simultaneously turned off even when a signal hydraulic pressure is applied to the first control oil compartment 97a of the coast brake cutoff valve 97. Accordingly, the oil is fed to the control oil compartment 98a of the overdrive lockout valve 98 and the ports 98b and 98c are connected to each other. As a result, the "S" range pressure is fed to the second control oil compartment 97b so that the coast brake cutoff valve 97 takes the left-hand position.

Engine brakes can therefore be applied effectively by feeding the oil to the hydraulic servomotor B-1 and the hydraulic servomotor B3 in the manner described above. Incidentally, the first solenoid valve S1 is turned on at the 1st and 2nd speeds but is turned off at the 3rd and 4th speeds. Since the ports 98b and 98c are cut off at the 1st and 2nd positions while the solenoid valves operate normally, the coast brake cutoff valve 97 is changed over by on/off control of the third solenoid valve S3.

However, the present invention is not limited to the embodiment described above and can be modified in various ways on the basis of the spirit of the present invention. Such modifications shall not be construed as being excluded from the scope of the present invention.

We claim:

1. An automatic transmission comprising:

a shift lever for selecting a speed range by movement to one of a plurality of shift positions;

range pressure regulating means for producing a range pressure in accordance with the selected speed range;

a controller for outputting a shifting output signal in accordance with one of said plurality of shift positions;

a plurality of shifting solenoid valves which are on or off and generate output signals in accordance with the shifting output signal from said controller;

a plurality of shift valves, each of said shift valves controlled by one of said shifting solenoid valves;

a plurality of hydraulic engine brake servomotors;

a coast brake cutoff valve, between said range pressure regulating means and said shift valves, for selectively feeding a hydraulic pressure to said hydraulic engine brake servomotors;

an engine brake solenoid valve, which is on or off responsive to the shifting output signal from said controller for controlling said coast brake cutoff valve; and a lockout valve, hydraulically connected between said coast brake cutoff valve and said range pressure regulating means, for selectively feeding the range pressure to said coast brake cutoff valve, responsive to an output signal of one of said shifting solenoid valves.

2. A hydraulic control system for an automatic transmission according to claim 1, wherein said lockout valve supplies the range pressure to the coast brake cutoff valve when a failure occurs.

3. A hydraulic control system for an automatic transmission according to claim 2, wherein said coast brake cutoff valve is selectively changed over in accordance with the range pressure from the lockout valve, and supplies the hydraulic pressure from the range pressure regulating means to one of the plurality of the shift valves, to hold the position of the one shift valve at low-position.

4. A hydraulic control system for an automatic transmission according to claim 1, wherein said plurality of shift positions include positions for an automatic shifting mode and positions for a manual shifting mode, and said controller outputs a shifting output signal to the engine brake solenoid valve when the shift lever is in one of the positions for the manual shifting mode.

5. A hydraulic control system for an automatic transmission according to claim 1, wherein said coast brake cutoff valve is selectively changed over in accordance with the range pressure from the lockout valve, and supplies the range pressure from the range pressure regulating means to one of the plurality of the shift valves, to hold the position of the one shift valve at low-position.

6. A hydraulic control system for an automatic transmission according to claim 4, wherein said positions for the automatic mode include a position for "D" range, said range pressure regulating means includes a manual valve moved by the shift lever in the automatic shifting mode, and said manual valve being held in the automatic mode position for "D" range while in the manual shifting mode.

7. A hydraulic control system for an automatic transmission according to claim 6, wherein said shift lever is shiftable to the positions of the manual shifting mode through the "D" range position of the automatic shifting mode.

8. A hydraulic control system for an automatic transmission according to claim 6, wherein said positions for the automatic shifting mode include a "S" range positions where an engine brake is applied.

9. A hydraulic control system for an automatic transmission according to claim 6, wherein said controller receives an electric signal in the manual shifting mode in accordance with the position of the shift lever.

10. hydraulic control system for an automatic transmission according to claim 6, wherein said positions for the manual sifting mode determine and hold gear speed in accordance with the position of the shift lever.

11. A hydraulic control system for an automatic transmission according to claim 3, wherein all of said shifting solenoid valves and engine brake solenoid valve are turned off responsive to a failure in the system.

12. A hydraulic control system for an automatic transmission according to claim 11, wherein said one shift valve is changed over at the low-position, when a failure occurs in the "S" range position of the automatic shifting mode, to inhibit a gear shift to highest gear speed and to produce an engine brake.

13. A hydraulic control system for an automatic transmission according to claim 10, wherein, in said automatic shifting model an engine brake is not applied at a portion of a plurality of gear speeds, and in said manual shifting model an engine brake is applied at shifting positions corresponding to said portion of plurality of gear speeds.

14. A hydraulic control system for an automatic transmission according to claim 8 wherein said "S" range of the automatic shifting mode applies an engine brake at a high gear speed, but not at a lower gear speed.

* * * * *

UNITED STATES PATENT AND TRADEMARK OFFICE
CERTIFICATE OF CORRECTION

PATENT NO. : 5,460,577
DATED : October 24, 1995
INVENTOR(S) : MOROTO et al

It is certified that error appears in the above-indentified patent and that said Letters Patent is hereby corrected as shown below:

Col. 2, line 12, delete "which is" and insert --the--;

line 13, delete "produced".

Col. 14, line 28, before "hydraulic" insert --A--; and line 46, delete "model" and insert --mode,--.

Signed and Sealed this

Twentieth Day of August, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,460,577
DATED : October 24, 1995
INVENTOR(S) : Moroto et al

It is certified that error appears in the above-indentified patent and that said Letters Patent is hereby corrected as shown below:

On the title page: Item [73] Assignees:", "TOYODA" should read --Toyota --.

Signed and Sealed this

Fifteenth Day of October, 1996

Attest:

BRUCE LEHMAN

*Attesting Officer*  *Commissioner of Patents and Trademarks*